US008678828B2

(12) United States Patent  
Gray (10) Patent No.: US 8,678,828 B2  
(45) Date of Patent: Mar. 25, 2014

(54) APPARATUS, SYSTEMS AND METHODS FOR LANGUAGE INSTRUCTION

(76) Inventor: Jennifer Liegh Gray, Woodstock (CA)

( * ) Notice: Subject to any disclaimer, the term of this patent is extended or adjusted under 35 U.S.C. 154(b) by 811 days.

(21) Appl. No.: 12/710,330

(22) Filed: Feb. 22, 2010

(65) Prior Publication Data

US 2010/0216099 A1  Aug. 26, 2010

Related U.S. Application Data

(60) Provisional application No. 61/154,692, filed on Feb. 23, 2009.

(51) Int. Cl.
*G09B 19/00* (2006.01)

(52) U.S. Cl.
USPC ........................................................ 434/167

(58) Field of Classification Search
USPC .......... 434/156, 159, 167, 171, 172, 176, 178
See application file for complete search history.

(56) References Cited

U.S. PATENT DOCUMENTS

| | | | | |
|---|---|---|---|---|
| 2,361,154 A * | 10/1944 | Schoolfield | .................... | 434/167 |
| 3,813,471 A * | 5/1974 | Dean, III | ........................ | 434/170 |
| 4,007,548 A * | 2/1977 | Cytanovich | .................... | 434/178 |
| 4,030,211 A * | 6/1977 | McGinley | ...................... | 434/167 |
| 4,045,031 A | 8/1977 | Arnold | | |
| 4,193,212 A * | 3/1980 | Al-Kufaishi | ................... | 434/178 |
| 4,204,343 A * | 5/1980 | Brooks | ........................... | 434/172 |
| 4,247,995 A * | 2/1981 | Heinberg | ....................... | 434/185 |
| 4,706,960 A | 11/1987 | Nowacki et al. | | |
| 4,955,616 A | 9/1990 | Ingalls | | |
| 5,788,503 A * | 8/1998 | Shapiro et al. | ................ | 434/172 |
| 6,491,524 B2 * | 12/2002 | Bender | .......................... | 434/159 |
| 7,011,525 B2 * | 3/2006 | Mejia | ............................. | 434/167 |
| 7,220,125 B1 * | 5/2007 | Blansett | ........................ | 434/185 |
| 2006/0040242 A1 * | 2/2006 | Mejia | ............................. | 434/170 |
| 2011/0045448 A1 * | 2/2011 | Hurford | ........................ | 434/172 |

OTHER PUBLICATIONS

Dawn Reithaug, "The 44* Phonemes", 2002 [retrived online Jun. 24, 2013].*

\* cited by examiner

*Primary Examiner* — Kurt Fernstrom  
(74) *Attorney, Agent, or Firm* — Bereskin & Parr LLP (57) ABSTRACT

An apparatus for language instruction including at least one vowel card object having text corresponding to a vowel sound for a language and at least one consonant card object having text corresponding to a consonant sound for the language. Combining the text of at least one of the consonant card objects with the text of at least one of the vowel card objects defines a phonetic sound in the language based on the vowel sound and the consonant sound.

20 Claims, 9 Drawing Sheets

APPARATUS, SYSTEMS AND METHODS FOR LANGUAGE INSTRUCTION

RELATED APPLICATIONS

This application claims the benefit of U.S. Provisional Patent Application Ser. No. 61/154,692, filed Feb. 23, 2009 and entitled "APPARATUS, SYSTEMS AND METHODS FOR LANGUAGE INSTRUCTION", the entire contents of which are hereby incorporated by reference herein for all purposes.

TECHNICAL FIELD

The embodiments disclosed herein relate to apparatus, systems and methods for language instruction.

SUMMARY

According to one aspect, there is an apparatus for language instruction including at least one vowel card object having text corresponding to a vowel sound for a language and at least one consonant card object having text corresponding to a consonant sound for the language. Combining the text of at least one of the consonant card objects with the text of at least one of the vowel card objects defines one of a phonetic sound or a phonemic sound in the language based on the vowel sound and the consonant sound.

The at least one vowel card object may include a plurality of vowel card objects. Furthermore, the plurality of vowel card objects may be a plurality of vowel cards. Each vowel card corresponds to one of the vowel card objects.

The at least one consonant card object may include a plurality of consonant card objects. Furthermore, the plurality of consonant card objects may be a plurality of consonant cards. Each consonant card corresponds to one of the consonant card objects.

The at least one vowel card object may include a plurality of vowel card objects and the at least one consonant card object may include a plurality of consonant card objects.

The apparatus may also include, a plurality of cards. Each card corresponds to either one of the vowel card objects or one of the consonant card objects.

The apparatus may also include a sound chart having a plurality of sound sections and a plurality of blank sections for receiving the cards. Each sound section corresponds to either one of the vowel card objects or one of the consonant card objects. Each blank section is associated with one of the sound sections such that placing one of the cards on the blank section unites the card with the associated sound section. Uniting the card with the sound section, such that the card and the sound section cooperate to represent one of the vowel card objects and one of the consonant card objects, combines the text of the vowel card object with the text of the consonant card object and defines the one of the phonetic sound or the phonemic sound.

The sound chart may also have a plurality of pronunciation sections. Each pronunciation section is associated with one of the sound sections and has pronunciation text corresponding to the proper pronunciation of the text in the sound section.

The apparatus may also include a game board having a plurality of sound spaces and a plurality of blank spaces for receiving the cards. Each sound space corresponds to either one of the vowel card objects or one of the consonant card objects. Each blank space is associated with one of the sound spaces such that placing one of the cards on the blank space unites the card with the sound space. Uniting the card with the sound space, such that the card and the sound space cooperate to represent one of the vowel card objects and one of the consonant card objects, combines the text of the vowel card object with the text of the consonant card object and defines the one of the phonetic sound or the phonemic sound.

The text of the vowel card object may include at least one character corresponding to a phoneme for the language. The text of the vowel card object may include a plurality of characters corresponding to a phoneme or phonemic blend for the language.

The text of the consonant card object may include at least one character corresponding to a phoneme for the language. The text of the consonant card object may include a plurality of characters corresponding to a phoneme or phonemic blend for the language.

According to another aspect, there is a sound ruler for language instruction including first and second surfaces. At least one of the first and second surfaces including a plurality of sections. Each section includes phonetic information associated with a phoneme, and a plurality of text combinations, each text combination corresponding to the phoneme.

Each section may include pronunciation information about how to pronounce the phoneme.

The plurality of sections may include at least one vowel section, wherein the phoneme for the vowel section is a vowel sound and each of the text combinations corresponds to the vowel sound. The plurality of sections may include at least one consonant section, wherein the phoneme for the consonant section is a consonant sound and each of the text combinations corresponds to the consonant sound.

According to another aspect, there is a method of language instruction including: selecting at least one vowel card object having text corresponding to a vowel sound for a language; selecting at least one consonant card object having text corresponding to a consonant sound for the language; combining the text of at least one of the vowel card objects with the text of at least one of the consonant card objects so as to define one of a phonetic sound (e.g. a word, vocabulary, or a combination of phonemic sounds to produce a word) or a phonemic sound in the language based on the vowel sound and the consonant sound.

The method may include audibly communicating the phonetic sound or the phonemic sound. The method may also include referring to pronunciation information about how to pronounce the phonetic sound or the phonemic sound.

Other aspects and features will become apparent, to those ordinarily skilled in the art, upon review of the following description of some exemplary embodiments.

BRIEF DESCRIPTION OF THE DRAWINGS

The drawings included herewith are for illustrating various examples of systems, methods, and apparatuses of the present specification and are not intended to limit the scope of what is taught in any way. In the drawings.

DETAILED DESCRIPTION

Figure 1:
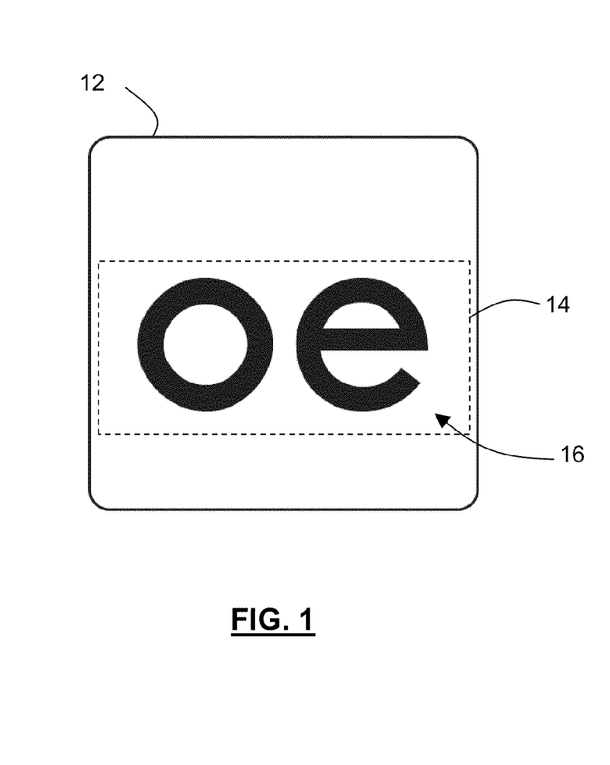
FIG. 1 is a first example of a vowel sound card for language instruction according to one embodiment.
Figure 2:
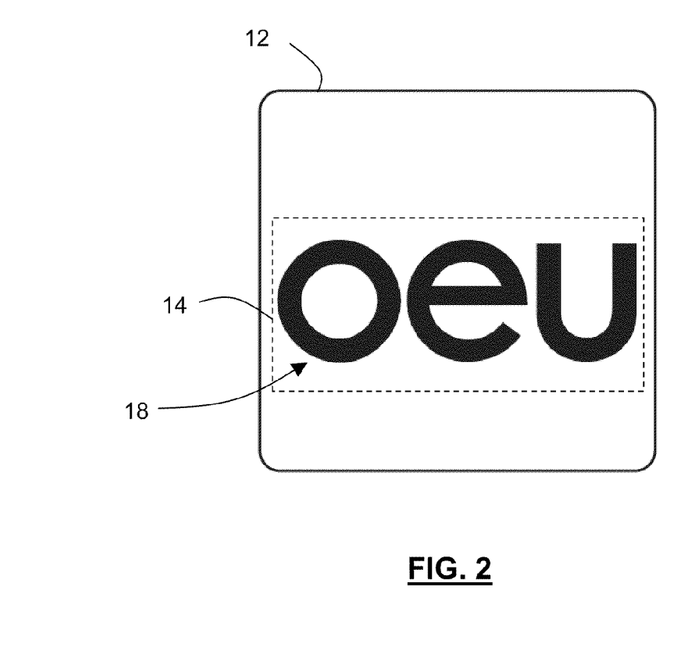
FIG. 2 is a second example of a vowel sound card.

Illustrated in FIGS. 1 and 2 are first and second examples of a vowel sound card 12 for use in language instruction according to one embodiment.

Each vowel sound card 12 includes a front face having central region 14 on which a portion of text is provided. For example, as shown in the first example in FIG. 1, the central region 14 may have a first text portion 16 that shows the letters "oe". Similarly, as shown in the second example in FIG. 2, the central region 14 may have a second text portion 16 that shows the letters "oeu".

Generally, the text portions are selected so as to correspond to a particular vowel sound for a particular language, as will be described in greater detail below. For example, when the vowel cards 12 are being used for instruction in French, the central region 14 may include text representing a vowel sound as selected from the list provided in Table 1:

TABLE 1

List of French Phonetic Sounds

| a | è | aî | ai | ie | au | ais | aux | oeu | aix | aient |
|---|---|----|----|----|----|-----|-----|-----|-----|-------|
| e | ê | ée | és | et | ées | est | er | eut | oue | où |
| i | é | ix | it | eut | os | eux | eu | ait | aie | oû |
| o | ô | oi | ot | oi | ois | ou | oix | uis | es | ue |
| u | ut | ui | uit | us | op | oie | eau | uie | out | |
| y | ez | is | oit | aut | oux | oe | eue | ous | eaux | |

In some embodiments, the back face of each vowel card 12 (generally opposite the central region 14, not shown) may be blank, or have a common symbol or pattern such that different vowel cards 12 cannot be readily distinguished from each other when placed face down.

The vowel card 12 may generally have any size and shape, but is preferably configured so as to be comfortably held by a person or a child in one hand, and is preferably thin enough to be held easily between the thumb and fingers. The vowel card 12 may be made of any suitable material, such as cardboard or plastic.

Figure 3:
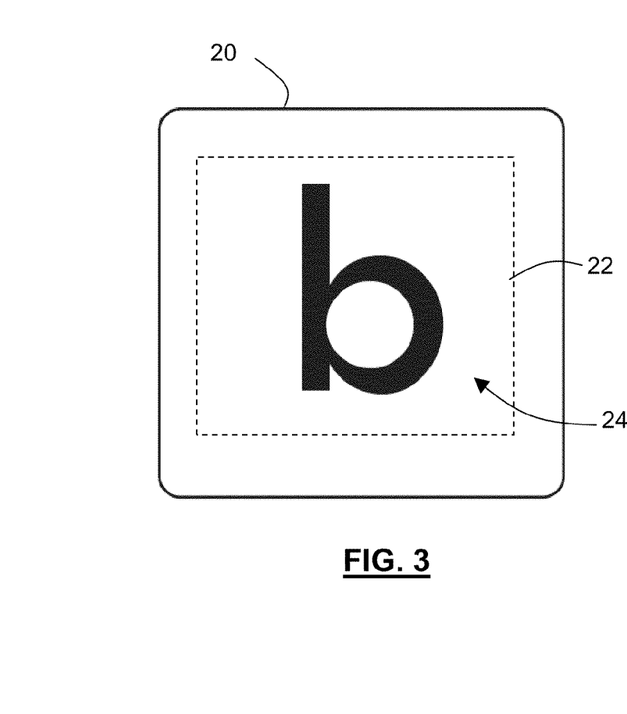
FIG. 3 is a first example of a consonant card for language instruction according to one embodiment.
Figure 4:
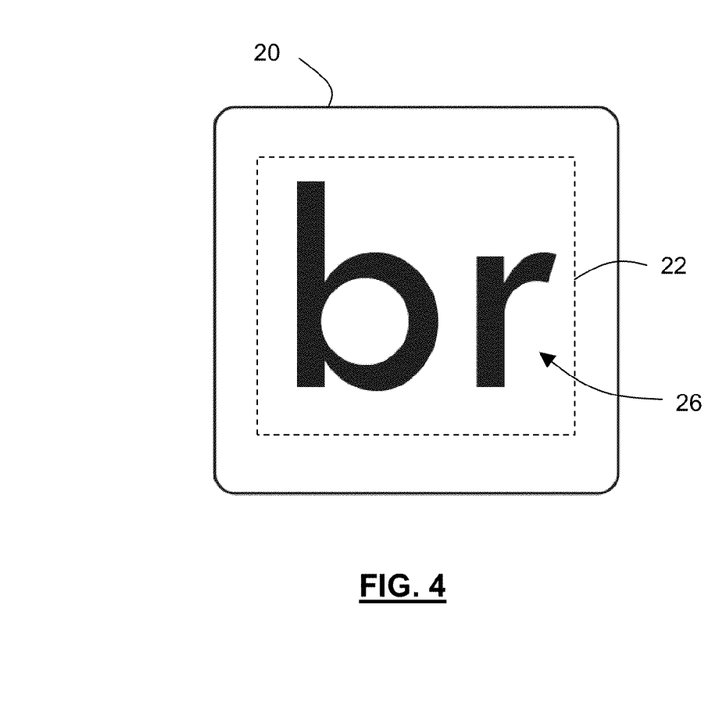
FIG. 4 is a second example of a consonant card.

Turning now to FIGS. 3 and 4, illustrated therein are first and second examples of consonant cards 20 for language instruction according to one embodiment.

Each consonant card 20 normally includes a front face having a central region 22 on which a portion of text is provided. For example, as shown in the example in FIG. 3, the central region 22 may have a text portion 24 that shows the letter "b". Similarly, as shown in FIG. 4, the central region 22 may have a printed text portion 26 that shows the letters "br".

Generally, the central region 22 of each consonant card 20 will include a portion of text selected so as to correspond to a particular consonant sound for a particular language, as will be described in greater detail below. For example, when the consonant cards 20 are being used for instruction in French, each central region 22 may include a consonant text portion selected from the list provided in Table 2:

TABLE 2

List of French Consonants

| n | p | v | r | g |
|---|---|---|---|---|
| qu | br | f | b | st |
| dr | tr | gr | cl | l |
| ch | s | z | t | h |
| str | c | j | d | pr |
| m | bl | cr | w | ç |
| pl | ll | ss | | |

Structurally, the consonant cards 20 may be similar to the vowel cards 12 (e.g. the back face may be blank, or have a common symbol or pattern), and may generally be of any suitable size, shape, and material.

In some embodiments, the consonant cards 20 and vowel cards 12 may have similar or matching back faces.

Alternatively, in other embodiments the consonant cards 20 and vowel cards 12 may have different back faces (e.g. the vowel cards 12 may all have similar back faces with a first pattern, while the consonant cards 20 may each have back faces with a second pattern that is different from the first pattern). In this manner, although the particular consonant card 20 and sound card 12 may be hidden when the cards are face down, a user can distinguish between vowel cards 12 and consonant cards 20.

According to one embodiment, the vowel cards 12 and consonant cards 20 may be used in combination for language instruction by selecting one vowel card 12 and one consonant card 20. The selected cards can then be combined together (generally placing the consonant card 20 in front of the vowel card 12 or vice versa) so that the text of the vowel card 12 and the consonant card 20 define a phonetic sound in the language based on the vowel sound and the consonant sound corresponding to each respective card. A student or another user may then read the phonetic sound aloud.

For example, when teaching French and where the particular consonant card 20 that was selected includes the letter "n", and the particular vowel card 12 that was selected includes the letters "ez", the selected cards can be read aloud together by the student saying the sound "nez".

Generally there is at least one vowel card 12 and at least one consonant card 20 that can be combined to form a phonetic or phonemic sound. In some embodiments, there may be a plurality of vowel cards 12 or consonant cards 20 that can be combined in different ways to define a plurality of phonetic sounds. For example, in some embodiments there may be one vowel card 12 that can be combined with a plurality of consonant cards 20. Similarly, there may be one consonant card 20 that can be combined with a plurality of vowel cards 12.

By mixing and matching different vowel cards 12 and consonant cards 20, students can learn to understand and speak different combinations of phonetic sounds in a particular language. Notably, the combinations of vowel cards 12 and consonant cards 20 need not form entire words in every case. In many embodiments, the combination of cards may simply form combinations of sounds that form the basis of other words. Accordingly, the combination of the vowel cards 12 and the consonant card 20 may define a phonemic sound.

In some embodiments, more than two cards 12, 20 may be combined, which may result in more complex sounds or words. For example, two vowel cards 12 may be combined with one consonant card 20 to define a phonetic sound, or vice versa.

Phonics generally refers to an instructional method for teaching reading. Phonics involves teaching students to connect the sounds of a spoken language (e.g. English, French) with letters or groups of letters (e.g. the sound /k/ can be represented by c, k, or ck spellings) and teaching them to blend the sounds of letters together to produce approximate pronunciations of unknown words.

From a linguistics perspective, spelling in some languages (e.g. English) is based on alphabetic principles, where letters are used to represent speech sounds, or "phonemes". For example, the word pat is spelled with three letters: "p", "a", and "t", each letter representing a phoneme, respectively, /p/, /ae/, and /t/. The spelling systems for some alphabetic languages, such as Spanish, are relatively simple because there is nearly a one-to-one correspondence between sounds and the letter patterns that represent them. English spelling, however, tends to be more complex, because it attempts to represent the 40+ phonemes of the spoken language with an alphabet composed of only 26 letters (and no accents). As a result, two letters are often fused together into groups that represent distinct sounds, referred to as digraphs. For example "t" and "h" placed side by side are used to represent either /θ/ or /ð/. Fusing a plurality of letters together in this way generally defines a sound that may be referred to as a phonemic blend.

Accordingly, vowel card 12 and consonant card 20 generally includes at least one character corresponding to a phoneme. The character may be a letter such as in English, a symbol such as in Chinese or Japanese, or another linguistic character.

In some embodiments, each vowel card 12 or consonant card 20 may include one letter corresponding to a phoneme. This may be the case when teaching Spanish.

In some embodiments, each vowel card 12 or consonant card 20 may include two or more letters thereon so as to represent a particular phoneme or phonemic blend. This may be the case when teaching English.

For simplicity, the word "phoneme" used herein may refer to a phoneme or a phonemic blend.

Table 3 below lists some additional examples of combinations of letters and the pronunciation of the corresponding phonemes used in the French language:

TABLE 3

Pronunciations for Some French Phonemes

| Letter | Pronunciation | Letters | Pronunciation |
|---|---|---|---|
| a | "a" | eu | [ø] "euh" |
| e | "je" | oi | [wa] |
| i | "ee" | oeu | [ø] "euh" |
| o | "oh" | eau | [o] |
| u | "ew" | aient | "bed" |
| ui | "wee" | é | "a" |
| au | [o] "oh" | ê | "bed" |
| ou | [u] "OO" | e | "bed" |
| ai | "a" | | |

Figure 5:
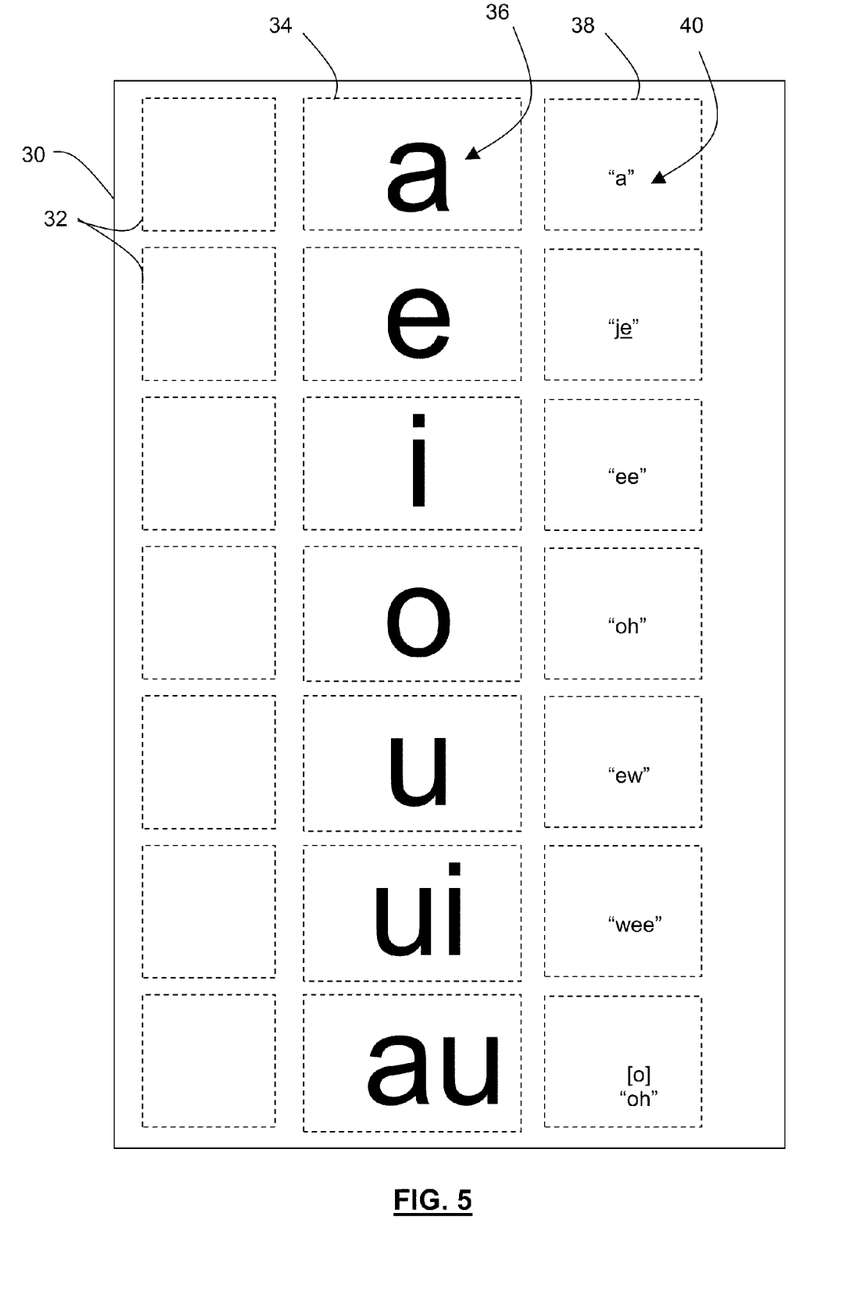
FIG. 5 is an example of a sound chart for language instruction according to another embodiment.

Turning now to FIG. 5, illustrated therein is a sound chart 30 for language instruction according to another embodiment.

The sound chart 30 includes a plurality of blank sections 32, a plurality of sound sections 34 each adjacent and vertically aligned with a particular blank section 32, and a plurality of pronunciation sections 38, each adjacent and vertically aligned with a particular sound section 34.

Each sound section 34 includes a text portion 36 with letters that correspond to a particular vowel sound. In other words, each sound section 34 may be similar to one of the vowel cards 12 described above and may visually correspond to that vowel card.

Each pronunciation section 38 includes pronunciation text 40 that corresponds to the proper pronunciation for the phoneme defined by the text portion 36 of the sound section 34.

The sound chart 30 is generally configured so that each blank section 32 is associated with a sound section 34, for example by horizontally aligning the sections. In some embodiments, the blank sections 32 may be associated with a sound section 34 in other ways, for example, through vertical alignment, connecting lines, or other forms of association. Similarly, the pronunciation section 38 may be associated with a sound section 34 using any suitable form of association.

The sound chart 30 may be configured for use with the consonant cards 20. During use, a student may select a particular consonant card 20 (e.g. by selecting the consonant card 20 at random or by selecting a known card), and then place the consonant card 20 onto one of the blank spaces 32 so as to unite the card 20 with the associated sound section 34. Once placed, the student can then combine the text of the consonant card 20 (corresponding to a consonant sound) with the text portion 36 in the adjacent sound section 34 (corresponding to a vowel sound) so as to define a phonetic sound and then attempt to read the combination aloud.

For example, suppose a student selects a consonant card 20 having a central region 22 with the letter "m" thereon. The student can place this card 20 adjacent the first blank space 32 shown in FIG. 5 that is associated with the sound section 34 with the text "a". The student can then attempt to pronounce the phonetic sound, in this example, the combination of the text defines the sound "ma".

The student may obtain guidance about how to properly pronounce the combination by consulting the pronunciation section 38 and reviewing the pronunciation text 40 therein.

Once a particular combination has been properly spoken, the student can then move the consonant card 20 to a different blank space 32 (e.g. the next blank space 32) on the sound chart 30, repeating the process as desired.

In some embodiments, the sound chart 30 may be used with vowel cards 12 and/or consonant cards 20. For example, the sounds sections 34 may have text corresponding to either a vowel sound or a consonant sound. In particular, one or more of the sound sections 34 may include a text portion with letters that correspond to a particular consonant sound such that the sound section 34 visually corresponds to a consonant card 20. Accordingly, a student may place a vowel card 12 on the blank space 32 so as to combine the text of the vowel card 12 (corresponding to a vowel sound) with the text of the sound space 34 (corresponding to a consonant sound) so as to define a phonetic sound.

The sound chart 30 may generally have any suitable size and shape, and may be made of any suitable material (e.g. cardboard or plastic). In some embodiments, a number of different sound charts 30 with different combinations of sound sections 34 may be provided.

Figure 6:
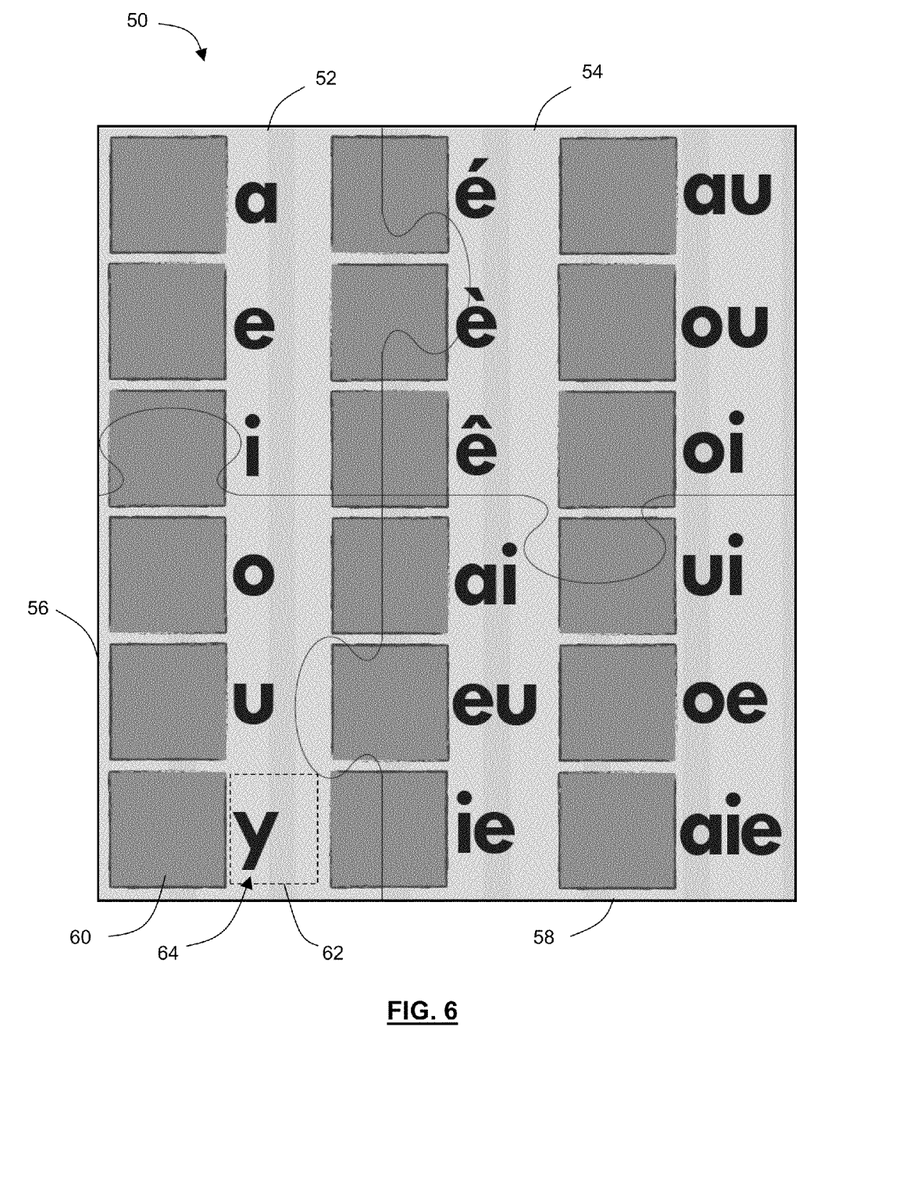
FIG. 6 is a game board for language instruction according to another embodiment.

Turning now to FIG. 6, illustrated therein is a game board 50 for language instruction according to another embodiment. As shown, the game board 50 may include a number of different pieces 52, 54, 56, and 58 that may be joined together to form the board 50.

The game board 50 generally includes a plurality of blank spaces 60, a plurality of sound spaces 62 adjacent each blank space 60, and a text portion 64 (within the sound space 62)

that comprises one or more letters corresponding to a particular sound. As indicated, each blank space 60 is associated with a sound space 62. For example, as shown in the illustrated embodiment, a blank space 60 may be horizontally aligned with a sound space 62. In some embodiments, the blank spaces 60 may associated with a sound space in other ways, for example, through vertical alignment, connecting lines, or other forms of association.

The text portion 64 within each sound space may correspond to a vowel sound or a consonant sound. Accordingly, each sound space 62 may be similar to one of the vowel cards 12 or one of the consonant cards 20 described above and may visually correspond to that vowel card or consonant card. As shown in the illustrated embodiment the sound spaces 62 have text corresponding to vowel sounds.

Similar to as with the sound chart 30 above, a student using the game board 50 can select a consonant card 20, place the consonant card 20 on one of the blank spaces 60 so as to unite the card with the associated sound space 62, and then attempt to speak the phonetic sound defined by the combination of the text on the consonant card 20 and the text portion 64 in the adjacent vowel sound space 62.

Once a particular combination has been spoken, the consonant card 20 can be moved to another blank space 60.

The game board 50 can generally have any suitable configuration of vowel sounds. For example, the game board 50 may have a configuration as generally shown in Table 4:

TABLE 4

Sample Board Layout for French

| a | é | au |
|---|---|---|
| e | è | ou |
| i | ê | oi |
| o | ai | ui |
| u | eu | oe |
| y | ie | aie |

In some embodiments, the game board 50 may have sound spaces 62 corresponding to consonant sounds. Accordingly, a student may select a vowel card 12 and place it on a blank space 60 so as to unite the card 12 with the associated sound space 62, and then attempt to speak the phonetic sound defined by the combination of the text on the vowel card 12 and the text portion 64 in the adjacent consonant sound space 62.

In some embodiments, the game board 50 may include some sound spaces 62 corresponding to consonant sounds and other sound spaces corresponding to vowel sounds. Accordingly the game board 50 may be used with both vowel cards 12 and consonant cards.

In some embodiments, instructions may be printed along one or more sides of the game board 50.

Figure 7:
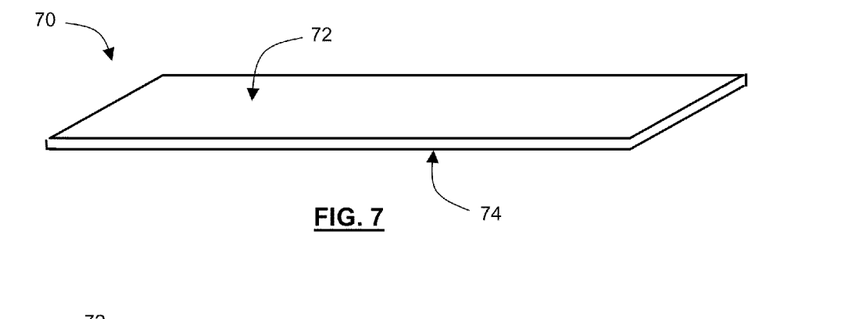
FIG. 7 is an example of a sound ruler for language instruction according to another embodiment.
Figure 8:
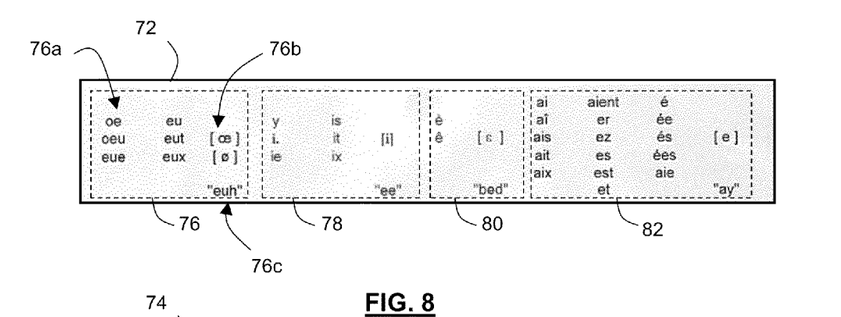
FIG. 8 is a sample layout of a first side of the sound ruler of FIG. 7.
Figure 9:
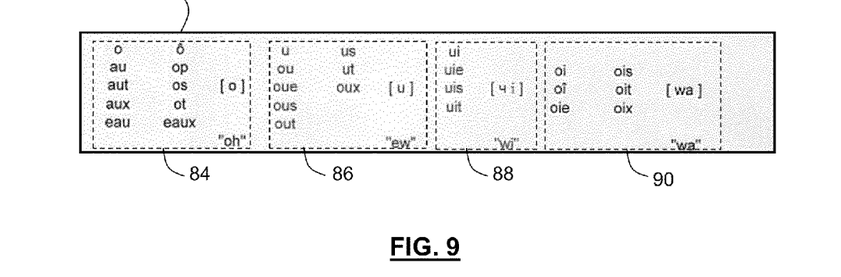
FIG. 9 is a sample layout of a second side of the sound ruler of FIG. 7.

Turning now to FIGS. 7 to 9, illustrated therein is a sound ruler 70 for use in language instruction according to another embodiment.

The sound ruler 70 may generally be made of any suitable size, shape, and material. As shown, the ruler 70 is generally elongate and narrow (similar to a conventional "ruler"), with opposing first and second surfaces 72, 74.

The sound ruler 70 may be used in combination with the vowel cards 12 and/or consonant cards 20 to provide language instruction and/or act as a reference tool.

As shown in FIG. 8, the first surface 72 of the sound ruler 70 includes a plurality of different sections 76, 78, 80, and 82. Similarly, the second surface 74 of the sound ruler 70 includes a plurality of sections 84, 86, 88 and 90.

Generally, each section (e.g. 76, 78, 80, 82, 84, 86, 88, and 90) may include phonetic information associated with a particular phoneme or vowel sound. For example, as shown the first section 76 includes text combinations 76a (e.g. "oe", "eu", "oeu", "eut", "eue", and "eux") that are associated with a first phoneme or vowel sound 76b (e.g. [oe] or [o]). As shown in the illustrated example, the text combinations 76a may be formed from letters, or in some embodiments, the text combinations 76a may be formed from other characters.

In some embodiments, each section may include pronunciation information about how a particular phoneme or sound ought to be pronounced. For example, in the illustrated embodiment, the first section 76 includes pronunciation information 76c, (e.g. "euh") about how that particular sound ought to be pronounced.

Generally, a student who is attempting to learn a particular language can inspect the sound ruler 70, look up a particular letter combination, determine the phonetic symbol beside the letter combination, and pronounce the combination based on the pronunciation information provided for that phonetic symbol.

The sound ruler 70 may be sized and shaped to function as a bookmark for use while reading books. This may provide a quick and easy reference tool while reading and encountering an unknown sound combination.

In some embodiments, each separate section (e.g. 76, 78, 80, 82, 84, 86, 88, and 90) may be separately color-coded so that text from adjacent or neighboring sections can be more easily distinguished.

In some embodiments, the sections (e.g. 76, 78, 80, 82, 84, 86, 88, and 90) may be located on only one surface of the sound ruler 70 (i.e. the first or second surface 72, 74). In other embodiments, there may one or more sections on the first 72 and one or more sections on the second surface 74.

Some of the sections (e.g. 76, 78, 80, 82, 84, 86, 88, and 90) may be vowel sections such that the phoneme for that section is a vowel sound and each of the text combinations corresponds to the vowel sound. Similarly, some of the sections may be consonant sections such that the phoneme for that section is a consonant sound.

The sound ruler 70 may be used according to one or more methods of language instruction. For example, in some embodiments, a plurality of vowel cards 12 may be shuffled and placed face down on a large surface. A student may then select two vowel cards 12 at random and then try to make a match based on pairs of sounds (as opposed to pairs of letters). For example, a match may be made where the two vowel cards 12 have letter combinations 76a (e.g. "oe", "eu", "oeu", "eut", "eue", and "eux") that are associated with a first phoneme or vowel sound 76b (e.g. [oe] or [ø]) as shown on the sound ruler 70.

If the student makes a match, then the student can then take another turn. If the student cannot make a match, then that student's turn ends (and another student may attempt to make a match).

In some embodiments, the student may speak the letters and/or sounds out loud as they turn over each card when trying to make a match.

In some embodiments, where more than one student is participating, each student may keep a score by counting the number of matches made by each student.

In some embodiments, the vowel cards 12 may be placed face up to allow the student to see the cards when attempting to make a match. This may make it easier for the student to make a match, and may be particularly suitable for younger students (e.g. children less than six years old).

In general, similar methods of language instruction may be implemented using the sound chart 30 or game board 50.

In some embodiments, the vowel cards 12 and consonant cards 20 can be used according to one or more methods of language instruction. For example, the vowel cards 12 and consonant cards 20 may be used as flash cards, with the cards being held in the student's hand and the various combinations being spoken out loud.

In some embodiments, the cards 12, 20 may be used in a variation of the game "go fish". Each player may select a predetermined number of cards (e.g. five cards). The players then take turns asking an opponent player for a particular phoneme sound that corresponds to one of the vowel cards 12 or consonant cards 20 they are holding in their hand. If the opponent player being asked also has a vowel card 12 or consonant card 20 corresponding to that particular phoneme sound, then he or she gives that card to the player that asked for it. After receiving the card, the player may then place the pair of cards on the table. If the opponent player being asked does not have that particular card, then the player asking may draw a card from a pile of cards. This game can continue until all matches have been made.

In some embodiments, the cards 12, 20 can be used with different game-type variations, such as "war" or "snap", with the rules being adjusted to fit.

In some embodiments, a plurality of sounds cards 12 and consonant cards 20 may be shuffled and placed face down on a large surface. A consonant card 20 and a sound card 12 can then be selected at random, and the student can try to properly speak the combination of sounds. In some embodiments, if the student can properly speak the combination of sounds, the student can then take another turn (until that student makes a mistake). The other students may then take a turn.

While some of the embodiments described above refer to vowel cards and consonant cards as individual physical cards, one or more of these cards may be visually represented as a card object. For example, a vowel card object or a consonant card object may be electronically represented on a computer monitor or another electronic display, for example, in a video game. Similarly, the card objects may be visually represented on physical objects such as a card, a game board, a sound chart, a sound ruler, or another physical object. For example, the sound section 34 of the sound chart 30 may represent a vowel card 12 or a consonant card 20. In another example, the sound space 62 of the game board 50 may represent a vowel card 12 or a consonant card 20.

Figure 10:
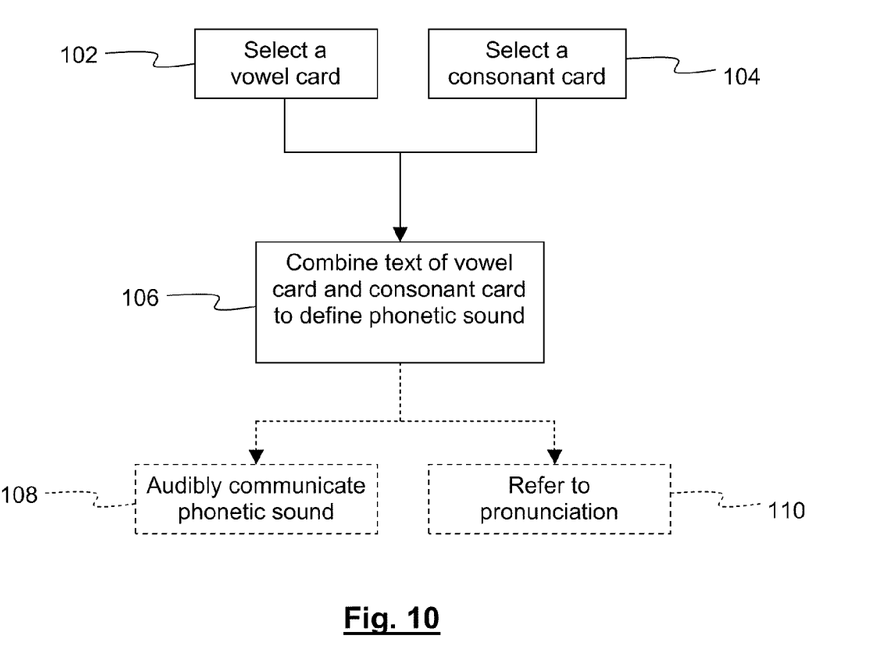
FIG. 10 is a flow chart illustrating a method of language instruction according to another embodiment.

Referring now to FIG. 10, illustrated therein is a method of language instruction 100 according to another embodiment.

Step 102 includes selecting at least one vowel card object having text corresponding to a vowel sound for a language.

Step 104 includes selecting at least one consonant card object having text corresponding to a consonant sound for the language.

The vowel card object and the consonant card object may be cards 12, 20 described above, or may be other card objects such as electronic representations of cards or physical representations of cards as described above.

The vowel card object and the consonant card object may be selected in any order. For example, the vowel card object may be selected first or the consonant card may be selected first. In some examples, the vowel card object and the consonant card object may be selected contemporaneously.

Step 106 includes combining the text of at least one of the vowel card objects with the text of at least one of the consonant card objects so as to define a phonetic or phonemic sound in the language based on the vowel sound and the consonant sound. The text may be combined in any suitable way, for example, by placing the card objects side-by-side, or by placing a card object on a game board or on a sound chart as described above.

In some embodiments, a user may select more than one vowel card objects or more than one consonant card objects. Selecting additional card objects may allow a student to combine the additional card objects in ways that form more complex sounds. For example, after learning to pronounce the sounds defined by the combination of one vowel card object and one consonant card object, a student may want to practice pronouncing more complex sounds. Accordingly, the student may proceed in their education by learning to pronounce the sounds defined by the combination of two vowel card objects and one consonant card objects, or vice versa. The student may progressively increase the number of cards being combined to learn to pronounce sounds or words with greater and greater complexity.

In some embodiments, the method 100 may include step 108 of audibly communicating the phonetic sound. For example, a student may read the combined text of the card objects aloud. In another example, an electronic device or computer may include a speaker that emits the phonetic sound, which may serve as a reference for proper pronunciation.

In some embodiments, the method may include step 110 of referring to pronunciation information about how to pronounce the phonetic sound. For example, the student may refer to textual pronunciation information, such as the pronunciation section 38 of the sound chart 30 described previously. In another example, the pronunciation information may be audibly communicated, for example, using a speaker on an electronic device or computer.

Figure 11:
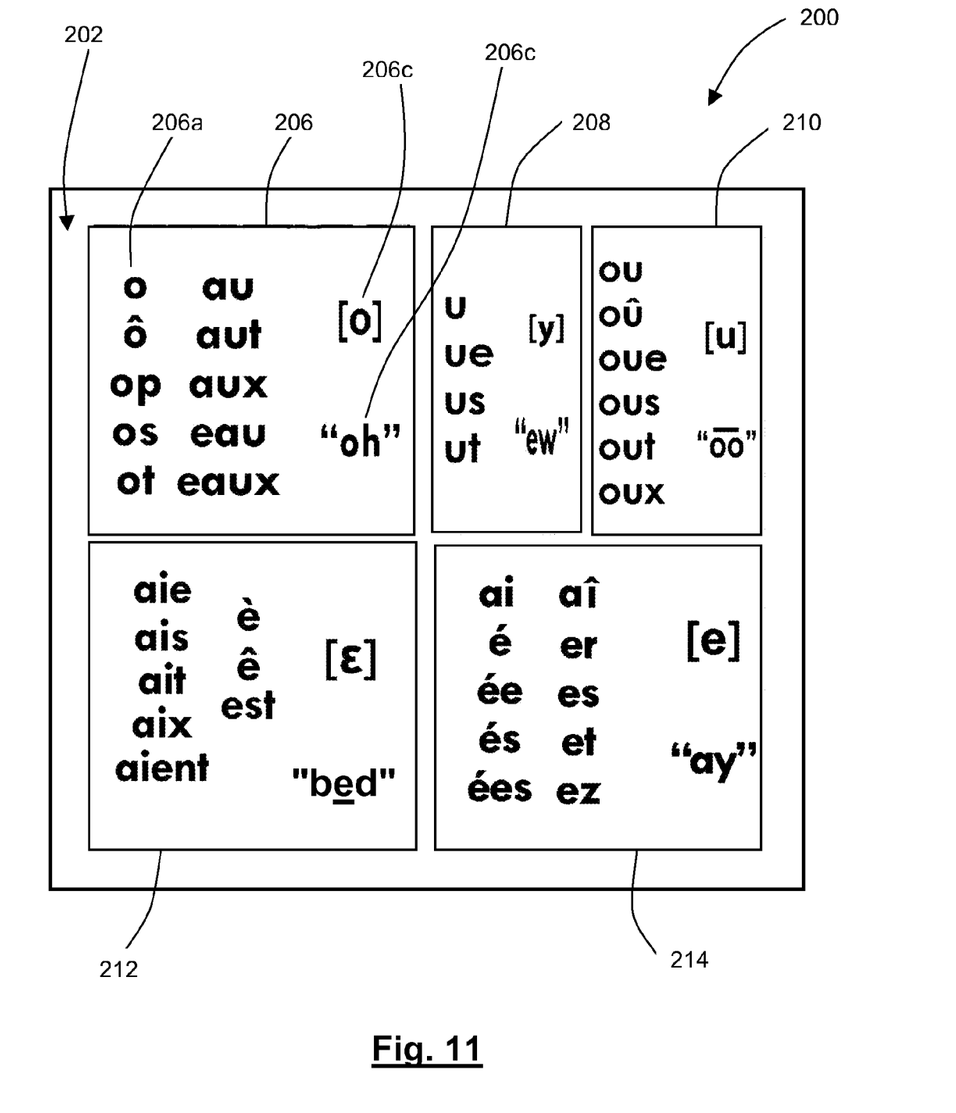
FIG. 11 is a sample layout of a first side of a sound page according to another embodiment.
Figure 12:
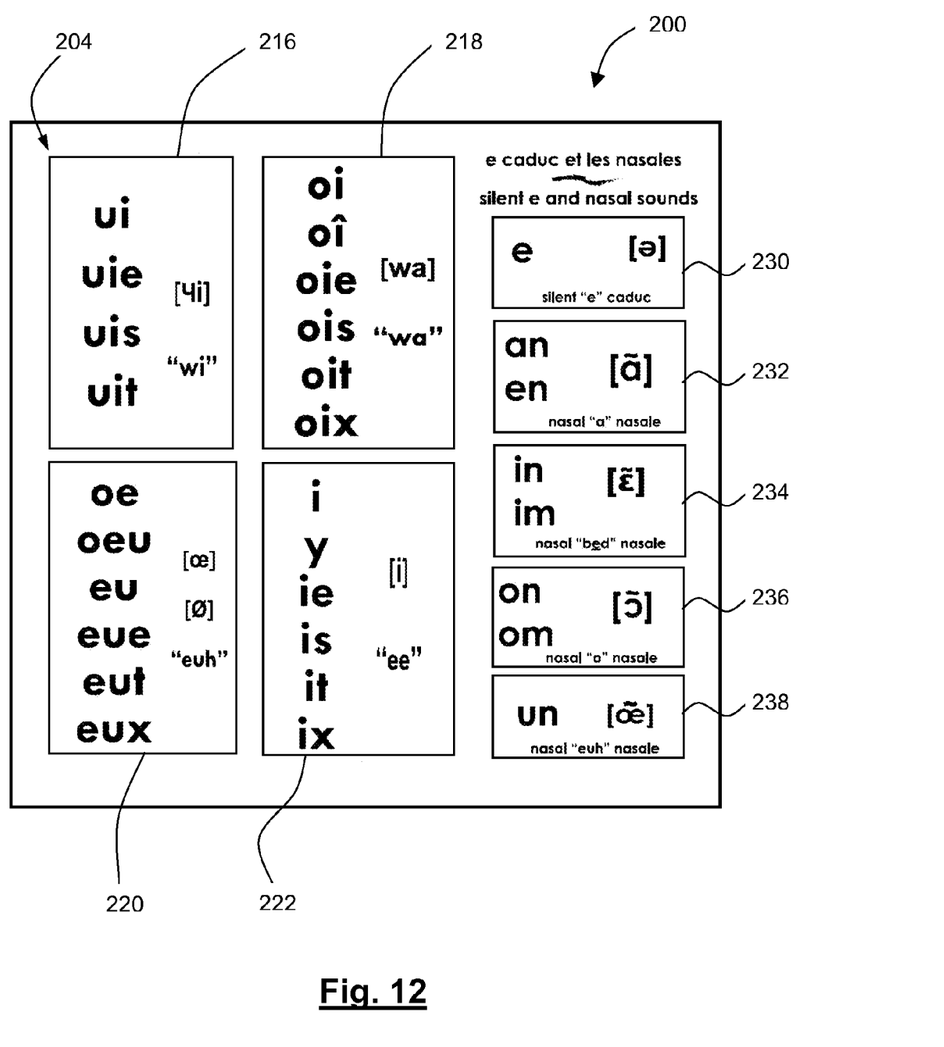
FIG. 12 is a sample layout of a second side of the sound page of FIG. 11.

Referring now to FIGS. 11 and 12 there is a sound page 200 according to another embodiment. The sound page 200 is generally similar to the sound ruler 70 and includes a first side 202 (shown in FIG. 11) and a second side 204 (shown in FIG. 12).

The sound page 200 includes sections 206, 208, 210, 212, and 214, one the first side 202 and sections 216, 218, 220, and 222 on the second side 204. The sections (206, 208, 210, 212, 214, 216, 218, 220, and 222) on the sound page 200 are generally similar to the sections (76, 78, 80, 82, 84, 86, 88, and 90) on the sound ruler 70.

Similar to the first section 76 of the sound ruler 70, the first section 206 of the sound page 200 includes text combinations 206a (e.g. "o", "ö", "op", "os", "ot", "au", "aut", "aux", "eau", and "eaux") that are associated with a first phoneme 206b (e.g. [o]). In some embodiments, the phoneme 206b may be a vowel sound or a consonant sound. As shown in the illustrated example, the text combinations 206a may be formed from letters, or in some embodiments, the text combinations 206a may be formed from other characters.

Also similar to the sound ruler 70, each section of the sound page 200 may include pronunciation information about how a particular phoneme or sound ought to be pronounced. For example, in the illustrated embodiment, the first section 206 includes pronunciation information 206c, (e.g. "oh") about how that particular sound ought to be pronounced.

The sound page 200 may also include sections 230, 232, 234, 236 and 238, which may be similar to the other sections 206, 208, 210, 212, 214, 216, 218, 220, and 222 in the sense that they include text combinations associated with a phoneme and may also include pronunciation information. One difference is the types of sounds pronounced.

For example, section 230 is directed to a silent "e". A silent "e" is generally not a phonetic sound in and of itself, but rather, alters the pronunciation of a particular portion of text.

For example, a silent "e" alters the pronunciation of a vowel between a "short vowel" and a "long vowel". For example, the word "tub" and "tube" are pronounced differently based on the silent "e" in "tube". In "tub", the "u" is pronounced as "uh", whereas in "tube" the "u" is pronounced as "oo". A silent "e" may have similar effects on other letters or letter combinations such as consonants. For example, the silent "e" changes the pronunciation in "mace" and "mac". In "mace" the "c" is pronounced soft as "se", whereas in "mac" the "c" is pronounced hard as "ck".

Sections 232, 234, 236 and 238 are directed to nasal sounds. Typically, a person pronounces these sounds by lowering the velum in their mouth such that some air escapes through the nose during production of the sound by the mouth. These sections may include pronunciation information for nasal vowel sounds and/or nasal consonant sounds. For example, section 232 refers to the nasal "a" sound, such as in the word "banque".

Figure 13:
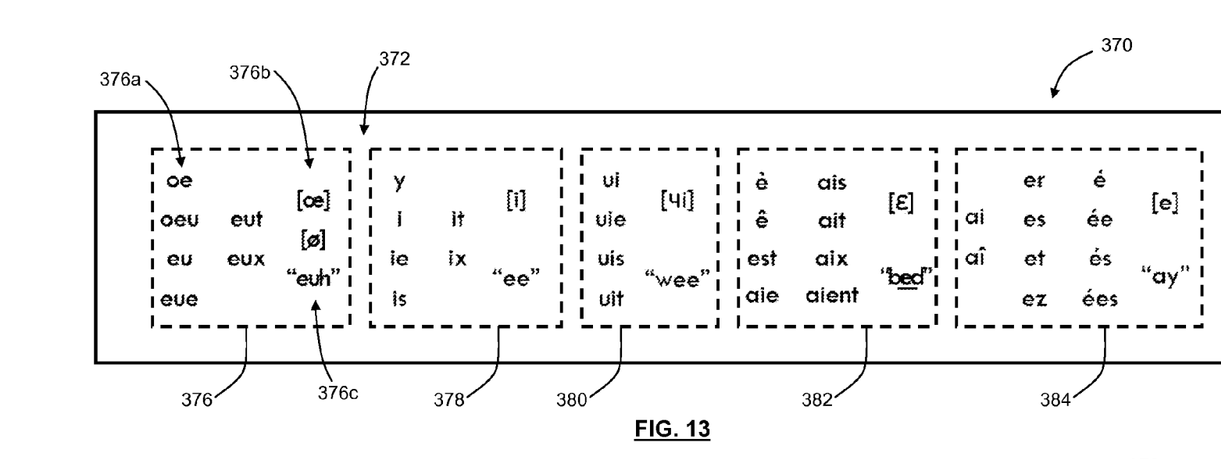
FIG. 13 is a sample layout of a first side of a sound ruler according to another embodiment.
Figure 14:
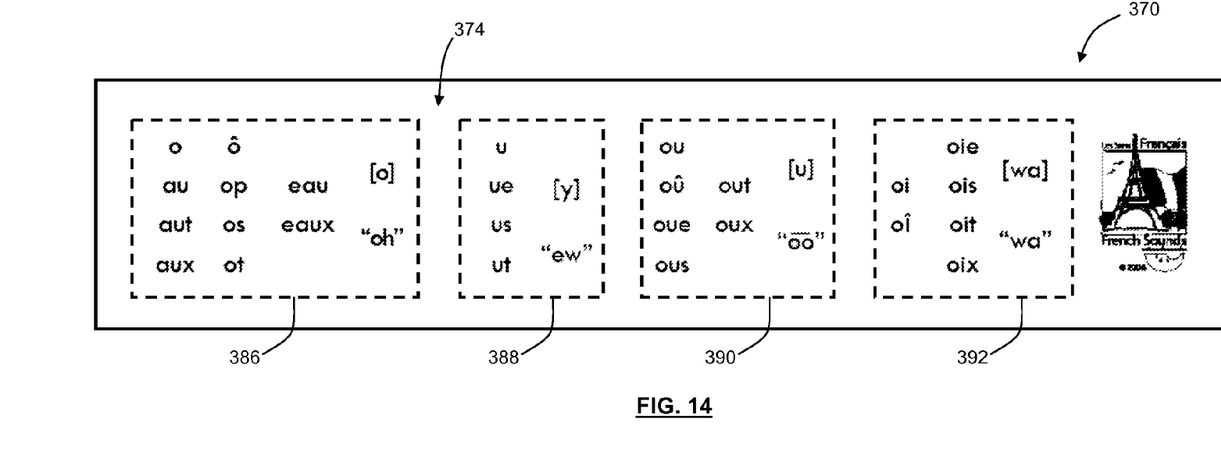
FIG. 14 is a sample layout of a second side of the sound ruler of FIG. 13.

Referring now to FIGS. 13 and 14 there is a sound ruler 370 according to another embodiment. The sound ruler 370 is generally similar to the sound ruler 70 described previously and similar elements are given similar reference numerals increased by three hundred.

The sound ruler 370 comprises first and second surfaces 372 and 374 that include a plurality of sections 376, 378, 380, 382, 384, 386, 388, 390, 392. Each section includes include phonetic information associated with a particular phoneme or vowel sound. For example, the first section 376 includes text combinations 376a (e.g. "oe", "oeu", "eu", "eue", "eut" and "eux") that are associated with a first phoneme or vowel sound 376b (e.g. [oe] or [ø]).

In some embodiments, each section may include pronunciation information about how a particular phoneme or sound ought to be pronounced. For example, in the illustrated embodiment, the first section 376 includes pronunciation information 376c, (e.g. "euh") about how that particular sound ought to be pronounced.

One difference between the sound ruler 370 and the sound ruler 70 described previously is that the sections may be different. For example, section 86 of the sound ruler 70 includes text combinations "u", "ou", "oue", "ous", "out", "us", "ut", and "oux" corresponding to the vowel sound [u], which may be pronounced as "ew".

In contrast, the sound ruler 370 may include sections with some of the same text combinations, but those sections may further differentiate the vowel sounds. For example, section 388 includes text combinations "u", "ue", "us", and "ut" corresponding to the vowel sound [y], which may be pronounced as "ew". Furthermore, section 390 includes text combinations "ou", "oû", "oue", "ous", "out", and "oux" corresponding to the vowel sound [u], which may be pronounced as "oo". The text combinations within sections 388 and 390 generally correspond to the text combinations within section 86 with the addition of "ue" in section 388 and "oû" in section 390. While these sounds may be similar to someone just starting to learn the language, the sounds may be differentiated when someone becomes more familiar with the sounds used in that language. Accordingly, the sound ruler 370 may be used for more advanced students.

As shown, the sound ruler 370 may also have some text combinations in different sections as compared to the sound ruler 70. For example, section 382 corresponds generally to section 80 but also includes some additional text combinations that were included in section 82 (e.g. "est", "aie", "ais", "ait", "aix", "aient"). Similarly, section 384 corresponds generally to section 82 but some text combinations were removed (e.g. (e.g. "est", "aie", "ais", "ait", "aix", "aient"). Rearranging the text combinations may be useful when teaching different languages or dialects.

The sound ruler 370 may also include different pronunciation information. For example, section 380 corresponds generally to section 88 but uses the pronunciation information "wi" instead of "wee". In some embodiments, the sound ruler 370 may include both versions of the pronunciation information.

The sound ruler 70, the sound page 200 and the sound ruler 370 described above may be referred to more generally as reference tools. The teachings herein may be applied to various other reference tools such as bookmarks, reference cards, electronic representations of any of these, or otherwise.

While the embodiments described herein (e.g. relating to vowel cards, consonant cards, sound charts, game boards, sound rulers) include a few exemplary text combinations defining vowel sounds and consonant sounds, and may include some exemplary pronunciation information, it will be understood and appreciated that other text combinations defining other phonetic sounds and using other pronunciation information are within the scope of the description.

Furthermore, the embodiments disclosed herein are generally suitable for use with any phonics-based language, such as, but not limited to, French, Spanish, and Italian.

While the above description provides examples of one or more methods and/or apparatuses, it will be appreciated that other methods and/or apparatuses may be within the scope of the present description as interpreted by one of skill in the art.

The invention claimed is:

1. An apparatus for language instruction comprising:
    a) at least one vowel card object having text corresponding to a vowel sound for a language;
    b) at least one consonant card object having text corresponding to a consonant sound for the language;
    c) wherein combining the text of at least one of the consonant card objects with the text of at least one of the vowel card objects defines one of a phonetic sound or a phonemic sound in the language based on the vowel sound and the consonant sound;
    wherein the at least one vowel card object comprises a plurality of vowel card objects and wherein the at least one consonant card object comprises a plurality of consonant card objects;
    d) a plurality of cards, each card corresponding to either one of the vowel card objects or one of the consonant card objects; and
    e) a sound chart having:
        i) a plurality of sound sections, each sound section corresponding to either one of the vowel card objects or one of the consonant card objects;
        ii) a plurality of blank sections for receiving the cards, each blank section being associated with one of the sound sections such that placing one of the cards on the blank section unites the card with the associated sound section;
    f) wherein uniting the card with the sound section, such that the card and the sound section cooperate to represent one of the vowel card objects and one of the consonant card objects, combines the text of the vowel card object with the text of the consonant card object and defines the one of the phonetic sound or the phonemic sound.

2. The apparatus of claim 1, wherein the plurality of vowel card objects is a plurality of vowel cards, each vowel card corresponding to one of the vowel card objects.

3. The apparatus of claim 1 wherein the plurality of consonant card objects is a plurality of consonant cards, each consonant card corresponding to one of the consonant card objects.

4. The apparatus of claim 1 wherein the sound chart has a plurality of pronunciation sections, each pronunciation section being associated with one of the sound sections and having pronunciation text corresponding to the proper pronunciation of the text in the sound section.

5. The apparatus of claim 1, wherein the text of the vowel card object comprises at least one character corresponding to a phoneme for the language.

6. The apparatus of claim 1, wherein the text of the vowel card object comprises a plurality of characters corresponding to a phoneme for the language.

7. The apparatus of claim 1, wherein the text of the consonant card object comprises at least one character corresponding to a phoneme for the language.

8. The apparatus of claim 1, wherein the text of the consonant card object comprises a plurality of characters corresponding to a phoneme for the language.

9. An apparatus for language instruction, comprising:
   a) at least one vowel card object having text corresponding to a vowel sound for a language;
   b) at least one consonant card object having text corresponding to a consonant sound for the language;
      wherein combining the text of at least one of the consonant card objects with the text of at least one of the vowel card objects defines one of a phonetic sound or a honemic sound in the language based on the vowel sound and the consonant sound:
      wherein the at least one vowel card object comprises a plurality of vowel card objects and wherein the at least one consonant card object comprises a plurality of consonant card objects, and the apparatus further comprises:
   c) a plurality of cards, each card corresponding to either one of the vowel card objects or one of the consonant card objects;
   d) a game board having:
      i) a plurality of sound spaces, each sound space corresponding to either one of the vowel card objects or one of the consonant card objects;
      ii) a plurality of blank spaces for receiving the cards, each blank space being associated with one of the sound spaces such that placing one of the cards on the blank space unites the card with the sound space;
   e) wherein uniting the card with the sound space, such that the card and the sound space cooperate to represent one of the vowel card objects and one of the consonant card objects, combines the text of the vowel card object with the text of the consonant card object and defines the one of the phonetic sound or the phonemic sound.

10. The apparatus of claim 9, wherein the text of the vowel card object comprises at least one character corresponding to a phoneme for the language.

11. The apparatus of claim 9, wherein the text of the vowel card object comprises a plurality of characters corresponding to a phoneme for the language.

12. The apparatus of claim 9, wherein the text of the consonant card object comprises at least one character corresponding to a phoneme for the language.

13. The apparatus of claim 9, wherein the text of the consonant card object comprises a plurality of characters corresponding to a phoneme for the language.

14. A method of language instruction comprising:
   a) selecting at least one vowel card object having text corresponding to a vowel sound for a language;
   b) selecting at least one consonant card object having text corresponding to a consonant sound for the language;
   c) combining the text of at least one of the vowel card objects with the text of at least one of the consonant card objects so as to define one of a phonetic sound or a phonemic sound in the language based on the vowel sound and the consonant sound;
      wherein the at least one vowel card object comprises a plurality of vowel card objects and wherein the at least one consonant card object comprises a plurality of consonant card objects, and
   d) selecting plurality of cards each card corresponding to either one of the vowel card objects or one of the consonant card objects;
   e) selecting a sound chart having:
      i) a plurality of sound sections, each sound section corresponding to either one of the vowel card objects or one of the consonant card objects; and
      ii) a plurality of blank sections for receiving the cards, each blank section being associated with one of the sound sections such that placing one of the cards on the blank section unites the card with the associated sound section; and
   f) uniting the card with the sound section such that the card and the sound section cooperate to represent one of the vowel card objects and one of the consonant card objects and combines the text of the vowel card object with the text of the consonant card object and defines the one of the phonetic sound or the phonemic sound.

15. The method of claim 14 further comprising audibly communicating the one of the phonetic sound or the phonemic sound.

16. The method of claim 14 further comprising referring to pronunciation information about how to pronounce the one of the phonetic sound or the phonemic sound.

17. The method of claim 14, wherein the text of the vowel card object comprises at least one character corresponding to a phoneme for the language.

18. The method of claim 14, wherein the text of the vowel card object comprises a plurality of characters corresponding to a phoneme for the language.

19. The method of claim 14, wherein the text of the consonant card object comprises at least one character corresponding to a phoneme for the language.

20. The method of claim 14, wherein the text of the consonant card object comprises a plurality of characters corresponding to a phoneme for the language.

* * * * *